US009126465B2

(12) United States Patent
Holland (10) Patent No.: US 9,126,465 B2
(45) Date of Patent: *Sep. 8, 2015

(54) HITCH GUIDE ASSEMBLY WITH DISPLACEABLE GUIDE MEMBER

(71) Applicant: LIKE PRODUCTS, INC., Missoula, MT (US)

(72) Inventor: Michael Holland, Missoula, MT (US)

(73) Assignee: Like Products, Inc., Missoula, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/176,416

(22) Filed: Feb. 10, 2014

(65) Prior Publication Data

US 2014/0291963 A1    Oct. 2, 2014

Related U.S. Application Data

(63) Continuation of application No. 13/954,744, filed on Jul. 30, 2013, now Pat. No. 8,646,799, which is a continuation of application No. PCT/US2013/031740, filed on Mar. 14, 2013.

(60) Provisional application No. 61/614,982, filed on Mar. 23, 2012.

(51) Int. Cl.
   *B60D 1/36*    (2006.01)

(52) U.S. Cl.
   CPC ...................................... *B60D 1/363* (2013.01)

(58) Field of Classification Search
   CPC ................................. B60D 1/36; B60D 1/363

USPC ......................................................... 280/477
See application file for complete search history.

(56) References Cited

U.S. PATENT DOCUMENTS

| | | |
|---|---|---|
| 3,773,356 A | 11/1973 | Eichels et al. |
| 4,254,968 A | 3/1981 | DelVecchio |
| 5,236,215 A | 8/1993 | Wylie |
| 5,330,196 A | 9/1994 | Ricles |
| 5,503,422 A | 4/1996 | Austin |
| 5,529,330 A | 6/1996 | Roman |
| 5,549,316 A | 8/1996 | Jones |
| 5,725,232 A | 3/1998 | Fleming |
| 5,779,256 A | 7/1998 | Vass |
| 6,102,422 A | 8/2000 | Damron |
| 6,382,653 B1 | 5/2002 | Bass |
| 6,698,783 B1 | 3/2004 | Zechbauer |
| 6,976,694 B1 | 12/2005 | Rayl et al. |
| 7,131,658 B2 | 11/2006 | MacKarvich |
| 7,744,110 B1 | 6/2010 | Ramon |
| 2010/0264626 A1 | 10/2010 | Morehead |

OTHER PUBLICATIONS

International Search Report and Written Opinion for international application PCT/US2013/031740, mailed May 23, 2013.

*Primary Examiner* — Tony Winner
(74) *Attorney, Agent, or Firm* — Moana IP Group (57) ABSTRACT

Hitch guide assemblies having a displaceable guide member are described. In certain embodiments, the hitch guide assembly comprises a guide a guide member and a guide mechanism that is adapted to displace the guide member upon the application of an external force to at least a portion of the guide mechanism.

18 Claims, 8 Drawing Sheets

HITCH GUIDE ASSEMBLY WITH DISPLACEABLE GUIDE MEMBER

CROSS REFERENCE TO RELATED APPLICATIONS

This application is a continuation of U.S. patent application Ser. No. 13/954,744, now U.S. Pat. No. 8,646,799, which is a continuation of International Application No. PCT/US2013/031740, filed Mar. 14, 2013, which claims the benefit under 35 U.S.C. §119(e) of U.S. Provisional Patent Application No. 61/614,982, filed Mar. 23, 2012, both of which are incorporated herein by reference in their entireties for all purposes.

FIELD

The present disclosure relates to hitch guide assemblies, including hitch guide assemblies having a displaceable hitch guide member. Also described is a method of positioning a trailer hitch for mating the trailer hitch with a vehicle tow hitch.

BACKGROUND

A variety of hitch assemblies have been designed to provide one or more guide structures that allow for the positioning and alignment of a trailer hitch with a vehicle tow hitch. Some of these guide structures are permanently attached to the tow hitch, which creates interference with the trailer hitch when the tow vehicle corners or turns. To avoid this inconvenience, other guide structures are designed to be removable. Such guide structures, however, can be time consuming to remove and require the operator to unbolt or otherwise disassemble the guide structure prior to towing. Accordingly, there remains a need to provide a hitch guide assembly that is easily displaced or retracted upon the attachment of the trailer hitch to the vehicle tow hitch.

SUMMARY

Described herein is a hitch guide assembly having a displaceable guide member. In certain embodiments, the hitch guide assembly comprises:
 a guide member; and
 a guide mechanism adapted to displace the guide member upon the application of an external force to at least a portion of the guide mechanism.

In certain embodiments, the hitch guide assembly is adapted to direct a trailer hitch to a vehicle tow hitch. In certain embodiments, the hitch guide assembly comprises:
 a main support body;
 a guide member slidably mounted on the main support body; and
 a guide mechanism pivotally mounted to the main support body and engaged with the guide member, wherein said guide mechanism is adapted to displace the guide member when the trailer hitch applies force to the guide mechanism.

DETAILED DESCRIPTION

The following is a description of exemplary hitch guide assemblies and components thereof. The embodiments described herein are exemplary in nature and are not intended to be limited in structure or application.

As used in this specification and the appended claims, the articles "a," "an," and "the" include plural referents unless expressly and unequivocally limited to one referent.

Figure 1:
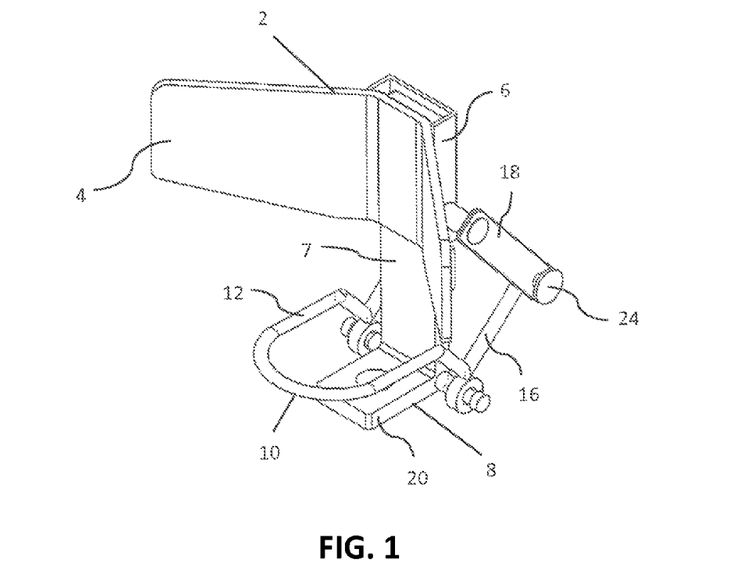
FIG. 1 is a perspective illustration of an exemplary a hitch guide assembly.

FIG. 1 is a perspective view of an exemplary hitch guide assembly. In certain embodiments, the hitch guide assembly comprises guide member 2, main support body 8, and a guide mechanism. As shown in FIG. 1, the guide mechanism may comprise hinge arm 10 and push arm 18.

Figure 3:
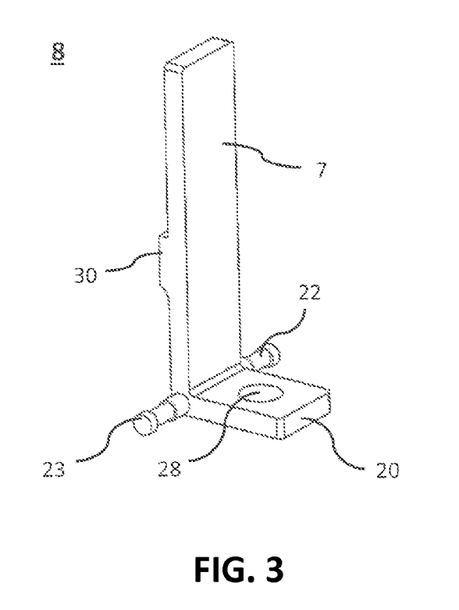
FIG. 3 is a perspective illustration of an exemplary main support body.

In certain embodiments, the main support body comprises an elongated body extending vertically. FIG. 3 is a perspective view of exemplary main support body 8, which comprises slide bar 7, bottom plate 20, guide member stop 30, and pivot connectors 22 and 23. In certain embodiments, the slide bar may be constructed out of flat iron stock (e.g., 2"×¾"×8½"). The bottom plate may be constructed from the same piece of stock as the slide bar, wherein the bottom plate is formed by bending the stock to form an L-shape (e.g., 80° angle). In certain embodiments, the bottom plate may be constructed out of flat iron stock (e.g., 3"×2"×¾") that is welded to the slide bar. In certain embodiments, bottom plate 20 may be constructed to define aperture 28. In certain embodiments, pivot connectors 22 and 23 may be created by welding threaded studs on the bottom plate or at the point at which the bottom plate and slide bar connect.

Figure 4:
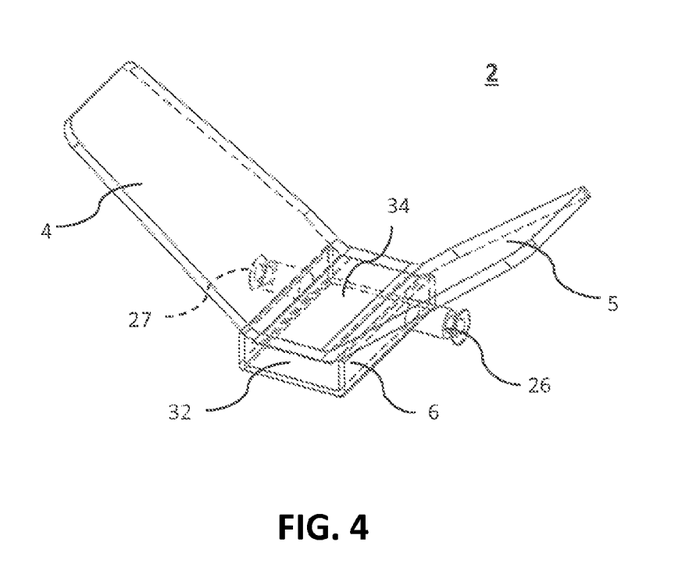
FIG. 4 is a perspective illustration of an exemplary guide member.

As shown in FIG. 4, guide member 2 comprises guide plates 4 and 5, back stop 34, guide member connectors 26 and 27, and slide channel 6. In certain embodiments, slide channel 6 is constructed to define slide channel opening 32. Guide member 2 comprises a unitary body, wherein guide plates 4 and 5 define a wedge (or V) shape. In certain embodiments, the guide plates may be connected to each other directly by a weld or bend, without a back stop. However, guide member 2 includes back stop 34 positioned between guide plates 4 and 5, which may connected by a weld or a bend in the same piece of material. In certain embodiments, the guide member may be defined by a particular width (e.g., 10") and height (e.g., 3¾"). Each guide plate may be constructed from similar pieces of flat steal or iron stock (e.g., ¼"×6"×3¾"). The dimensions of the back stop may also be constructed from similar materials (e.g., 2"×3¾"). Slide channel 6 is connected to the wedge via the back side of back stop 34. In certain embodiments, the slide channel may be formed out of steel or iron stock, wherein the slide channel defines an opening having dimensions (e.g., 1"×2"×3¾") appropriate for receiving at least a portion of the main support body (e.g., slide bar 7). The guide member connectors may be constructed from threaded studs welded to each side of the slide channel.

Figure 6:
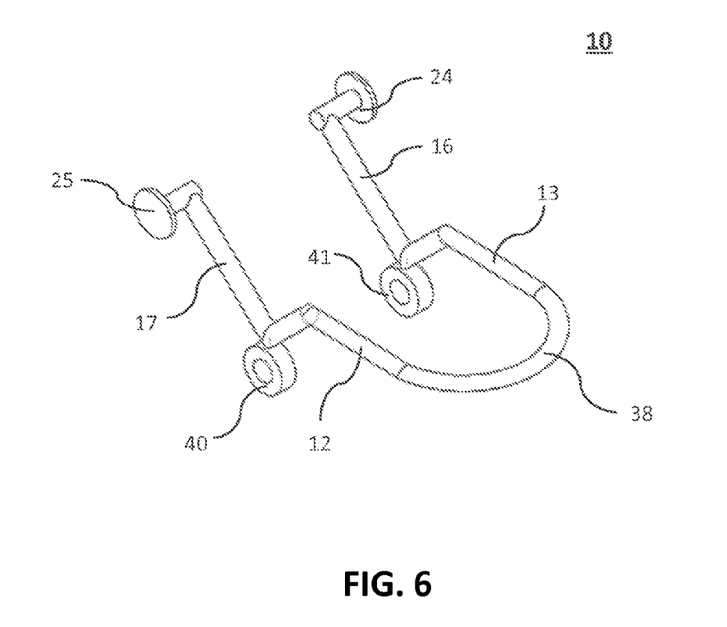
FIG. 6 is a perspective illustration of an exemplary hinge arm.

As shown in FIG. 6, exemplary hinge arm 10 may comprise arch 38, proximal straight stretches 12 and 13, pivot collars 40 and 41, distal straight runs 16 and 17, and hinge arm connectors 24 and 25. In certain embodiments, the hinge arm may be constructed from an iron rod (e.g., about ⅜") bent at a 180° angle to form a U-shaped arch (e.g., arch 38). In certain embodiments, the resulting U-shaped structure defines two proximal straight stretches (e.g., about 2½") and extends downward at an angle (e.g., about 70°) for a distance (e.g., about 2"). The straight stretches may then be bent upward at an angle (e.g., about 90°) and extend into distal runs for a distance (e.g., about 3").

As noted above, the guide mechanism may comprise a hinge arm and a push arm. Reference to the "proximal end" of the guide mechanism generally refers to portions of the guide mechanism positioned in front of the main support body. For example, with reference to FIGS. 1 and 6, the "proximal end" of the guide mechanism would be represented by the arch 38 and proximal straight stretches 12 and 13. On the other hand, reference to the "distal end" of the guide mechanism generally refers to portions of the guide mechanism positioned behind the main support body. For example, with reference to FIGS. 1 and 2, the "distal end" of the guide mechanism would be represented by distal straight runs 16 and 17, and push arms 18 and 19. In certain embodiments, the proximal end of the guide mechanism is adapted to allow engagement of the trailer hitch with the vehicle tow hitch. That is, in certain embodiments, the proximal end of the guide mechanism is shaped to allow for the simultaneous: application of force to the guide mechanism; and engagement (e.g., connection) of the trailer hitch to the hitch point (e.g., ball hitch) of the vehicle tow hitch. In certain embodiments, as demonstrated in the figures, this may accomplished by providing a hinge arm that surrounds at least a portion of, or is in close proximity with, the ball hitch.

Figure 5:
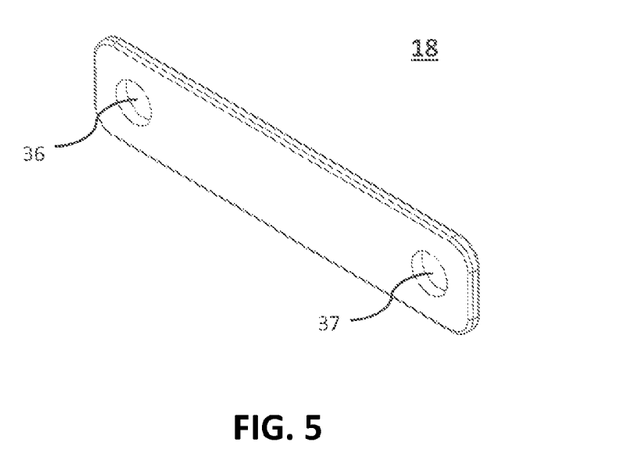
FIG. 5 is a perspective illustration of an exemplary push arm.

FIG. 5 illustrates an exemplary structure of a push arm, which defines apertures 36 and 37. Push arms may be constructed from flat iron stock and, in certain embodiments, may measure about 4" long and about ⅛" thick.

In certain embodiments, the hitch guide assembly is adapted to direct a trailer hitch to a vehicle tow hitch. In addition, the hitch guide assembly may protect the back of the tow vehicle from the trailer hitch as the operator backs the tow vehicle in an attempt to connect the trailer to the vehicle tow hitch. Accordingly, in certain embodiments, the hitch guide assembly is adapted to connect to the tow vehicle. In certain embodiments, the hitch guide assembly and the vehicle tow hitch are constructed as part of a single unit. In other embodiments, the hitch guide assembly is adapted to attach to a tow vehicle via a vehicle tow hitch. In certain embodiments, the vehicle tow hitch comprises a vehicle mount and a hitch point. The vehicle mount represents the primary structure that connects a trailer to the tow vehicle. The hitch point represents the point at which the trailer hitch engages and connects to the vehicle tow hitch. An exemplary vehicle mount would include a tow stinger, while an exemplary hitch point would include a ball hitch. In certain embodiments, the hitch guide assembly is adapted to connect to the vehicle tow hitch by attaching the bottom plate of the main support body to the stinger via the hitch ball. As noted above, bottom plate 20 of main support body 8 may define aperture 28. Thus, in certain embodiments, the hitch guide assembly is adapted to connect to a vehicle tow hitch by positioning the bottom plate between the hitch ball and the stinger, wherein the bottom plate is held in place by passing the hitch ball connection through the bottom plate aperture.

As noted above, in certain embodiments, both the guide mechanism and the guide member are mounted to the main support body. In certain embodiments, the guide mechanism comprises a hinge arm, which is pivotally mounted to the main support body. In certain embodiments, the guide member is slidably mounted to the main support body. In certain embodiments, the hinge arm comprises at least one proximal straight stretch and at least one distal straight run. In certain embodiments, the distal end of the guide mechanism comprises the at least one distal straight run of the hinge arm, and at least one push arm. In certain embodiments, the distal end of the guide mechanism is engaged with the guide member. In certain embodiments, the distal end of the guide mechanism is connected (e.g., bolted) to the guide member.

With reference to the exemplary embodiments illustrated in FIGS. 1-6, hinge arm 10 is pivotally mounted to main support body 8 via pivot connectors 22 and 23, and pivot collars 40 and 41. Guide member 2 is slidably mounted to main support body 8 by positioning slide bar 7 within slide channel opening 32. Hinge arm 10 is connected to push arms 18 and 19 via hinge arm connectors 24 and 25, respectively. Push arms 18 and 19 are connected to guide member 2 by guide member connectors 26 and 27, respectively. As shown in FIG. 5, the connections of push arms 18 and 19 can be done through apertures 36 and 37.

Figure 7:
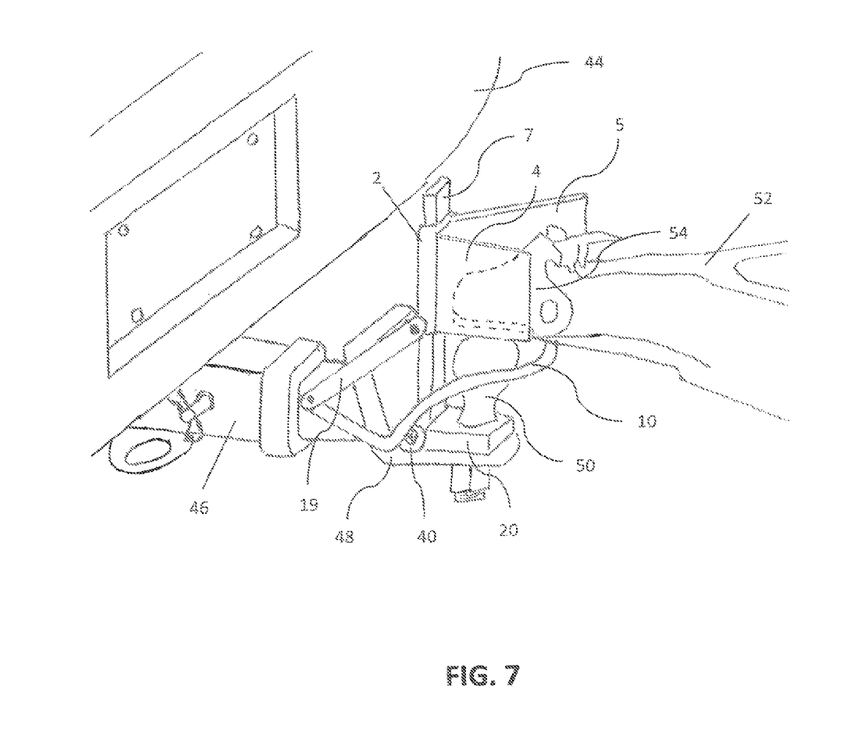
FIG. 7 is a perspective illustration of an exemplary hitch guide assembly mounted on a vehicle tow hitch, demonstrating the positioning a trailer hitch for connection to the vehicle tow hitch by the guide member of the hitch guide assembly.
Figure 8:
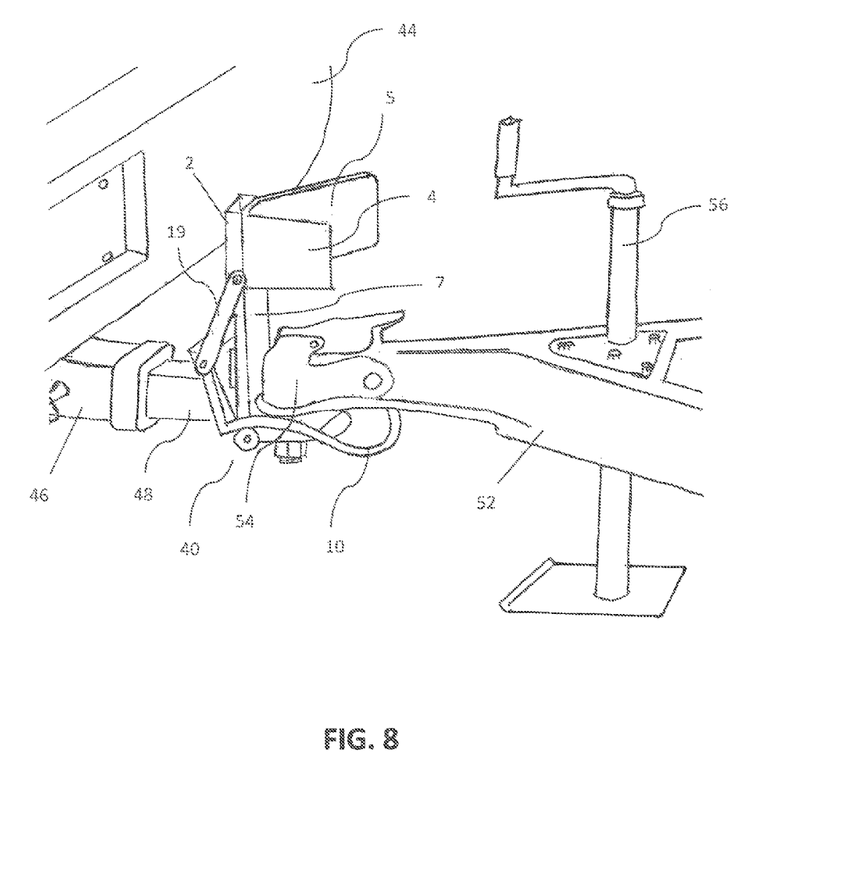
FIG. 8 is a perspective illustration of an exemplary hitch guide assembly mounted on a vehicle tow hitch, wherein the process of connecting a trailer hitch to the vehicle tow hitch displaces the guide member of the hitch guide assembly.

Operation of one embodiment of a hitch guide assembly is exemplified in FIGS. 7 and 8. The tow vehicle may comprise bumper system 44 and vehicle tow hitch 46. Vehicle tow hitch 46 comprises a vehicle mount and a hitch point, e.g., tow stinger 48 and ball hitch 50, respectively. The hitch guide assembly is connected to vehicle tow hitch 46 by bolting bottom plate 20 of the main support body between ball hitch 50 and stinger 48. Trailer hitch 52 of a trailer includes trailer tongue 54. With particular reference to FIG. 7, as the tow vehicle is backed up by the operator in an effort to connect the trailer to the vehicle tow hitch, trailer tongue 54 (partially obscured by guide plate 4) is guided into position over hitch ball 50 by the wedge shape that is defined by guide plates 4 and 5 of guide member 2. Once in position, the operator may lower trailer hitch 52. As trailer hitch 52 is lowered, it contacts and applies force to hinge arm 10.

With reference to FIG. 8, complete lowering of trailer hitch 52 by crank mechanism 56 simultaneously allows for: the engagement of trailer tongue 54 with hitch ball 50; and the vertical displacement of guide member 2. Hinge arm 10 is hingedly connected to guide member 2 via one or more push arms, including push arm 19. The application of external force to hinge arm 10 by trailer tongue 54 as the trailer is lowered allows for pivoting of hinge arm 10 about its connection to the main support body by the one or more pivot collars, including pivot collar 40. Thus, the pivoting of hinge arm 10 vertically displaces guide member 2 along slide bar 7 via the one or more push arms, including push arm 19. In certain embodiments, the vertical displacement of guide member 2 moves the guide member out of the operating plane of trailer hitch 52.

In certain embodiments, movement of the guide member out of the plane of the trailer hitch may help to increase the turning radius of the tow vehicle. For example, in certain embodiments, turning and/or sharp cornering by the tow vehicle may result in contact between the tow hitch and the guide member if both devices operate in the same horizontal plane. Accordingly, in certain embodiments, the hitch guide assembly described herein allows for the displacement of the guide member outside of the plane of operation of the tow hitch.

Figure 9:
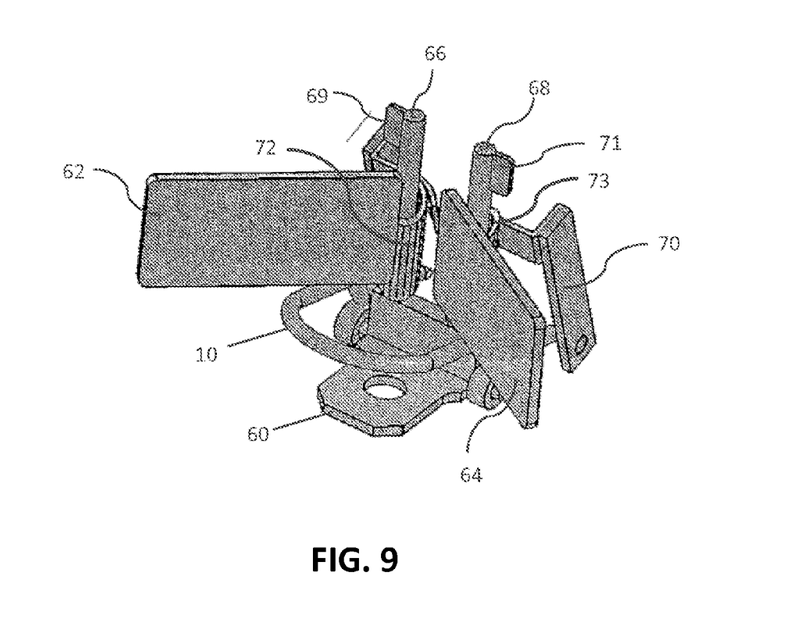
FIG. 9 is a perspective illustration of an exemplary hitch guide assembly having guide plates adapted for horizontal displacement.
Figure 10:
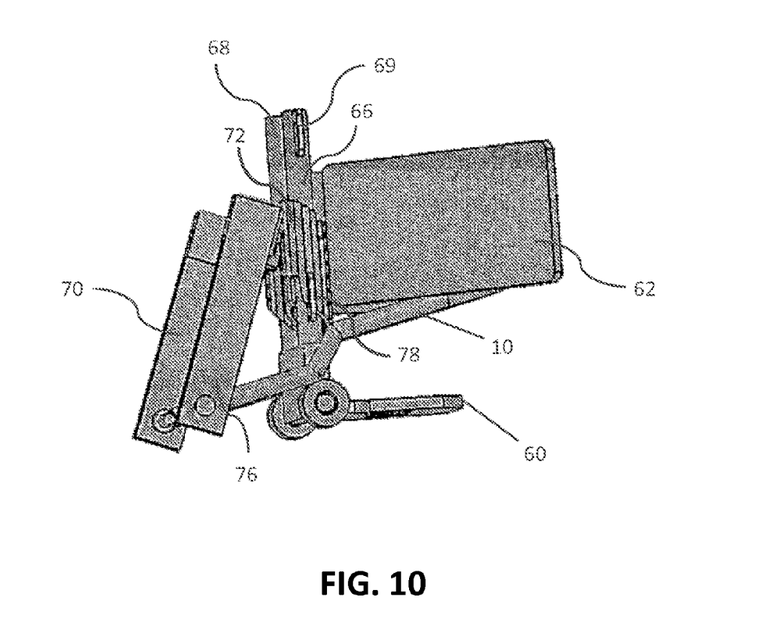
FIG. 10 is a side view illustration of an exemplary hitch guide assembly having guide plates adapted for horizontal displacement.

In certain embodiments, the guide member may be moved out of the operating plane of the trailer hitch in a horizontal manner. For example, in certain embodiments, the hitch guide assembly is adapted to allow for the horizontal displacement of the guide plates. In certain embodiments, the horizontal displacement of the guide plates comprises converting the wedge-shape of the guide member into a planar shape. Exemplary hitch guide assemblies capable of horizontally displacing the guide member are illustrated in FIGS. 9 and 10, wherein the guide assembly includes main support body 60, hinge arm 10, guide member comprising guide plates 62 and 64, slide channels 72 and 73 attached to guide places 62 and 64, respectively, and push arms 70 and 76. Main support body 60 also includes slide bars 66 and 68, as well as upper tabs 69 and 71, and lower tab 78.

Figure 11:
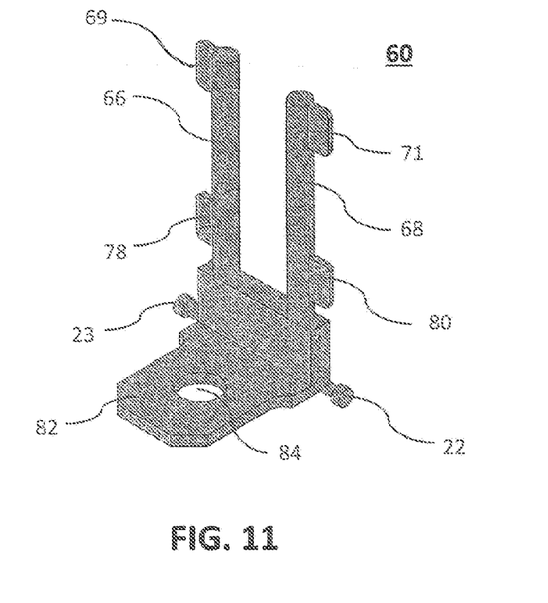
FIG. 11 is a perspective illustration of an exemplary main support body adapted for the horizontal displacement of the guide member.

FIG. 11 illustrates main support body 60, which comprises bottom plate 82, pivot connectors 22 and 23, and slide bars 66 and 68. In certain embodiments, bottom plate 82 is constructed to define aperture 84. In certain embodiments, pivot connectors 22 and 23 may be created by welding threaded studs on bottom plate 82. In certain embodiments, slide bars 66 and 68 may be created from pieces of round stock welded to bottom plate 82. Upper tabs 69 and 71, as well as lower tabs 78 and 80, may be cut from flat stock and welded to their respective slide bars.

Figure 12:
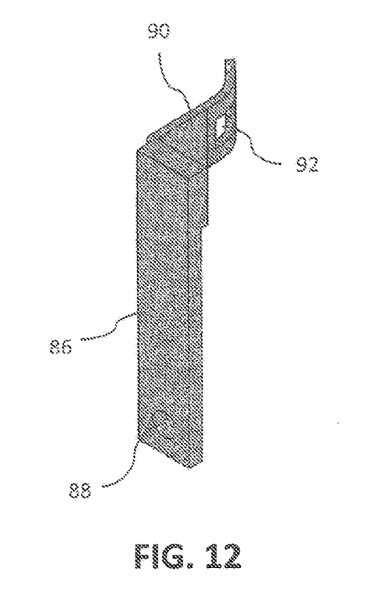
FIG. 12 is a perspective illustration of an exemplary push arm.

FIG. 12 illustrates an exemplary push arm, which may be used for either of push arms 70 and 76. The push arm of FIG. 12 includes main arm 86, which defines aperture 88. Flange 90 is connected to the main arm 86, and defines slotted aperture 92. In certain embodiments, main arm 86 and flange 90 may be created from a single piece of flat stock that is shaped to provide the appropriate structure. Alternatively, flange 90 can be created from a separate piece of material that is welded to main arm 86.

Figure 13:
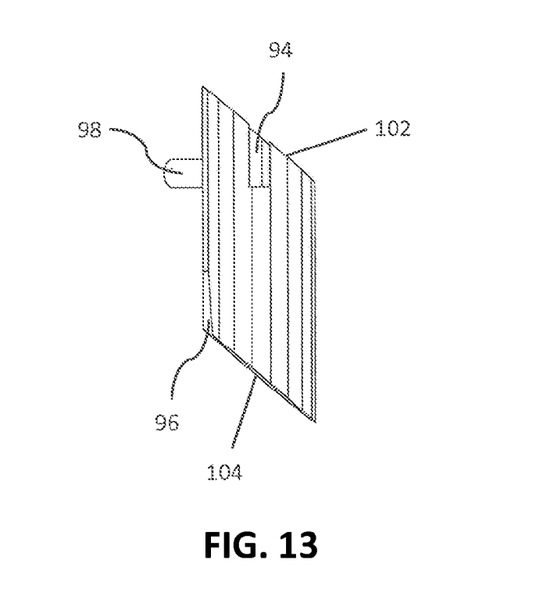
FIG. 13 is a side view illustration of an exemplary slide channel adapted for the horizontal displacement of the guide member.
Figure 14:
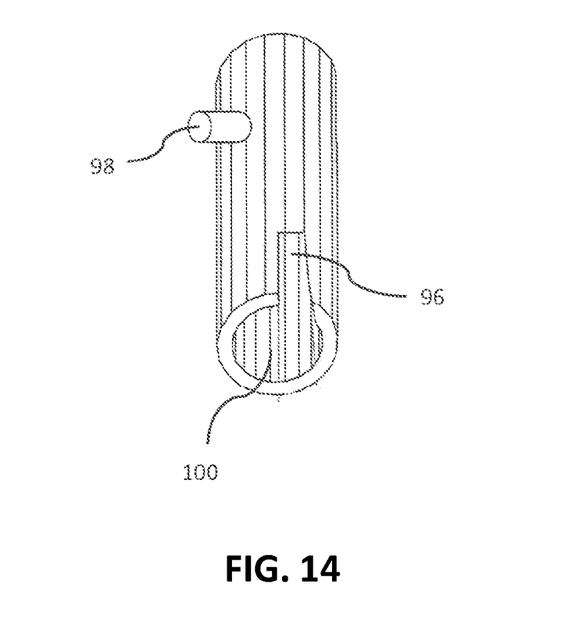
FIG. 14 is a perspective illustration of an exemplary slide channel adapted for the horizontal displacement of the guide member.

FIGS. 13 and 14 illustrate an exemplary slide channel, which may be used for slide channels 72 and 73. As noted above, a slide channel may be independently connected to each of the guide plates. For example, slide channels 72 and 73 may be welded to guide plates 62 and 64, respectively. The exemplary slide channels are shaped to define upper curvature 102 and lower curvature 104. In certain embodiments, the slide channels will each comprise at least one notch. In certain embodiments, the slide channels will each comprise at least two notches. For example, the slide channel illustrated in FIG. 13 comprises upper notch 94 and lower notch 96. Upper notch 94 and lower notch 96 are offset, and are adapted to allow for engagement with the upper and lower tabs on a slide bar. For example, with reference to the figures, slide bar 66 may be positioned within the slide channel via slide channel opening 100, such that bottom notch 96 and top notch 94 are shaped to allow for engagement with lower tab 78 and upper tab 69, respectively, as the slide channel moves along slide bar 66. The flange of push arms 70 and 76 may be connected to their respective slide channels via guide member connector 98 and slotted aperture 92.

Figure 2:
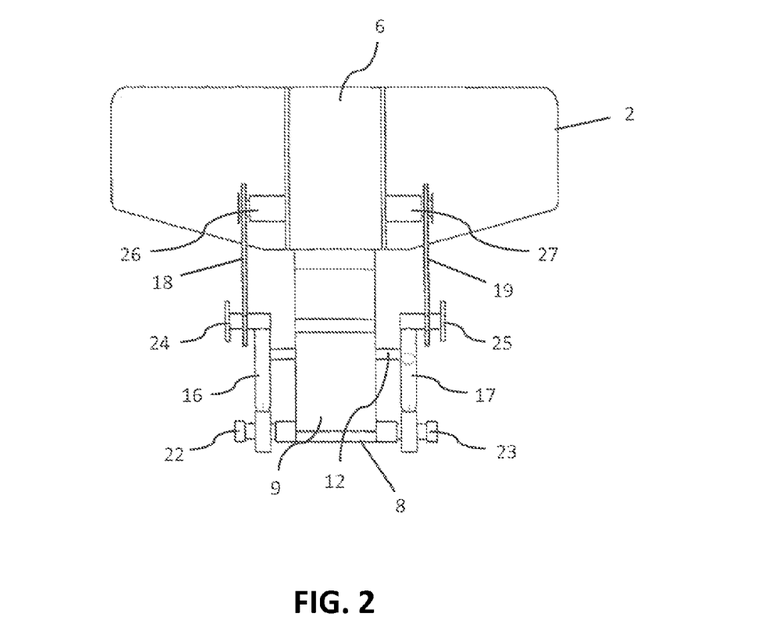
FIG. 2 is a rear view illustration of an exemplary a hitch guide assembly.

As with the hitch guide assemblies of FIGS. 1 and 2, the hitch guide assemblies of FIGS. 9 and 10 may be attached to a vehicle tow hitch via bottom plate 82 and aperture 84. In the resting state, guide plates 62 and 64 form a wedge shape, which is held rigidly in place by the engagement of the bottom notches of slide channels 72 and 73 with the lower tabs of slide bars 66 and 68. The hitch guide assembly may be operated by applying external force against the proximal end of U-shaped hinge arm 10, which is pivotally mounted to main support body 60, and hingedly connected to slide channels 72 and 73 via hinge arms 76 and 70, respectively. Force applied by the push arms against the slide channels moves the slide channels, and the guide plates connected thereto, vertically along slide bars 66 and 68. Engagement of upper curvature 102 of the slide channel with an upper tab allows for rotation of the slide channel about the axis of the slide bar. The simultaneous rotation of the slide channels about the axis of each slide bar allows for opening of the wedge shape by horizontally displacing the guide plates 62 and 64. Engagement of the top notches with upper tabs 69 and 71 locks the guide member into an "open" configuration, wherein guide member 62 and 64 take on a planar shape. Thus, in certain embodiments, the hitch guide assembly is adapted to simultaneously displace the guide member in a horizontal and vertical manner. Slotted aperture 92 in the push arms allows for the free movement of guide member connector 98 as the slide channels rotate about their respective slide bars.

The removal of force from hinge arm 10 (e.g., disengaging a trailer hitch) allows for the hitch guide assembly to return to its resting state. The top notches of the slide channel will disengage from upper tabs 69 and 71. Engagement of lower curvature 104 of the slide channel with a lower tab allows for rotation of the slide channel about the axis of the slide bar. The simultaneous rotation of the slide channels about the axis of each slide bar allows for the closing of the guide plates and the return of the guide member to a wedge shape. Engagement of bottom notches with lower tabs 78 and 80 locks guide plates 62 and 64 back into the wedge shape.

The foregoing descriptions and embodiments have been provided for purposes of illustration. They are not intended to be exhaustive or limit the scope of what is described and/or claimed herein.

The invention claimed is:

1. A hitch guide assembly comprising:
   a guide member; and
   a guide mechanism adapted to displace the guide member upon the application of an external force to at least a portion of the guide mechanism, wherein said hitch guide assembly is adapted to direct a trailer hitch to a vehicle tow hitch, and wherein said guide mechanism is adapted to horizontally displace the guide member from a resting position out of an operating plane of the trailer hitch as the external force is applied to at least a portion of the guide mechanism, and allow the guide member to return to said resting position upon a removal of the external force.

2. The hitch guide assembly according to claim 1, further comprising a main support body.

3. The hitch guide assembly according to claim 2, wherein at least a portion of the main support body comprises an elongated body extending vertically.

4. The hitch guide assembly according to claim 2, wherein the guide mechanism is mounted to the main support body.

5. The hitch guide assembly according to claim 4, wherein the guide mechanism is pivotally mounted to the main support body.

6. The hitch guide assembly according to claim 5, wherein the guide mechanism comprises a proximal end and a distal end.

7. The hitch guide assembly according to claim 6, wherein the distal end of the guide mechanism is connected to the guide member.

8. The hitch guide assembly according to claim 6, wherein the guide mechanism is adapted to displace the guide member when the external force is applied to the guide mechanism by a trailer hitch.

9. The hitch guide assembly according to claim 8, wherein the external force is applied to the proximal end of the guide mechanism.

10. The hitch guide assembly according to claim 9, wherein the proximal end of the guide mechanism is adapted to allow engagement of a trailer hitch with a vehicle tow hitch.

11. The hitch guide assembly according to claim 10, wherein the external force applied to the proximal end of the guide mechanism occurs during the engagement of a trailer hitch with a vehicle tow hitch.

12. The hitch guide assembly according to claim 2, wherein the guide member is mounted to the main support body.

13. The hitch guide assembly according to claim 12, wherein the guide member is slidably mounted to the main support body.

14. The hitch guide assembly according to claim 2, wherein the guide member comprises at least two guide plates.

15. The hitch guide assembly according to claim 14, wherein the at least two guide plates are adapted to form a wedge shape prior to application of the external force to the guide mechanism.

16. The hitch guide assembly according to claim 15, wherein the horizontal displacement of the guide member comprises a transition of the guide member from a wedge shape to a planar shape.

17. The hitch guide assembly according to claim 14, wherein the at least two guide plates are adapted to form an open configuration upon application of the external force to at least a portion of the guide mechanism.

18. The hitch guide assembly according to claim 1, wherein the guide mechanism is adapted to horizontally displace the guide member upon application of the external force to at least a portion of the guide mechanism.

* * * * *